United States Patent [19]

Ikeda et al.

[11] Patent Number: 5,646,238
[45] Date of Patent: Jul. 8, 1997

[54] PREPARATION PROCESS OF POLYHYDROXYCARBOXYLIC ACID

[75] Inventors: Kan Ikeda; Shoji Obuchi; Masahiro Ohta, all of Fukuoka-ken, Japan

[73] Assignee: Mitsui Toatsu Chemicals, Inc., Tokyo, Japan

[21] Appl. No.: 503,768

[22] Filed: Jul. 18, 1995

[30] Foreign Application Priority Data

| Jul. 27, 1994 | [JP] | Japan | 6-175137 |
| Jul. 27, 1994 | [JP] | Japan | 6-175138 |
| Aug. 26, 1994 | [JP] | Japan | 6-201896 |
| Aug. 29, 1994 | [JP] | Japan | 6-203135 |

[51] Int. Cl.[6] ............................ C08G 63/06
[52] U.S. Cl. ............ 528/361; 528/354; 528/480; 528/486; 528/494; 528/495; 528/502 R; 528/503
[58] Field of Search ............ 528/361, 354, 528/480, 486, 494, 495, 502, 503

[56] References Cited

U.S. PATENT DOCUMENTS

| 4,471,077 | 9/1984 | Lange | 521/64 |
| 4,645,664 | 2/1987 | Lange | 424/78 |
| 5,310,865 | 5/1994 | Enomoto et al. | 528/361 |

FOREIGN PATENT DOCUMENTS

| 58-206637 | 12/1983 | Japan . |
| 59-96123  | 6/1984  | Japan . |
| 61-28521  | 2/1986  | Japan . |
| 61-42531  | 3/1986  | Japan . |
| 63-254128 | 10/1988 | Japan . |
| 4-337321  | 11/1992 | Japan . |
| 6-172502  | 6/1994  | Japan . |

*Primary Examiner*—James J. Seidleck
*Assistant Examiner*—Duc Truong
*Attorney, Agent, or Firm*—Burns, Doane, Swecker & Mathis

[57] ABSTRACT

A preparation process of solid polyhydroxycarboxylic acid comprising subjecting an organic solvent solution of polyhydroxycarboxylic acid to cooling•solidification and grinding. The preparation process can provide high molecular weight solid polyhydroxycarboxylic acid with ease and cheaply, can be converted with ease to a continuous system, and is useful in industry.

7 Claims, No Drawings

PREPARATION PROCESS OF POLYHYDROXYCARBOXYLIC ACID

BACKGROUND OF THE INVENTION

1. Field of the Invention

The present invention relates to a preparation process of polyhydroxycarboxylic acid which is useful as a biodegradable polymer that can be substituted for materials and general purpose resins.

2. Description of the Related Art

Polyhydroxycarboxylic acid is excellent in mechanical, physical and chemical properties and additionally has a biodegradable function so that it can be degraded in the natural environment without giving a harmful effect on living organisms and is finally decomposed by microorganisms into water and carbon dioxide. Thus, polyhydroxycarboxylic acid plastics have recently received particular attention in various fields such as alternatives for medical materials and general purpose resins.

As a common preparation process of polyhydroxycarboxylic acid, it has been known that a high molecular weight polymer can be obtained by conducting dehydration dimerization of hydroxycarboxylic acid, for example, lactic acid and glycolic acid, and successively subjecting the resultant cyclic dimer to ring-opening melt polymerization in the presence of a catalyst (Sn-base catalyst) (hereinafter referred to as an indirect polymerization process). In the process, however, reaction procedures are complex, the polymer obtained is expensive, and additionally, the shape of the polymer is restricted to pellets because the product of melt polymerization is pelletized as such. Further, the process cannot be applied to some of hydroxycarboxylic acid which do not form the cyclic dimer.

On the other hand, processes for obtaining polyhydroxycarboxylic acid by direct dehydration polymerization (hereinafter referred to as a direct polymerization process) have been disclosed in Japanese Laid-Open Patent SHO 59-096123 and 61-028521. These processes have no restriction mentioned above on the raw material and can prepare polymers and copolymers from various kinds of hydroxycarboxylic acid.

Further, the process is much simplified so as to obtain the polymer by the direct polymerization of hydroxycarboxylic acid and is thus a useful preparation process in industry.

Various processes have been known for separating polyhydroxycarboxylic acid from an organic solvent solution of the polymer. However, a satisfactory process in industry has not yet been known.

For example, a generally known process to obtain a solid polymer is to first dissolving the polymer in a good solvent and then depositing the polymer by bringing the polymer into contact with a non-solvent or a lean solvent. However, application of the method to the polymer leads to such problems that the deposited polymer forms a gel and stirring becomes difficult or the gel adheres to the inner wall of the vessel.

As a countermeasure for these problems, Japanese Laid-Open Patent SHO 63-254128 has disclosed a process for carrying out the purification and isolation of the polymer at the same time by bringing the polymer into contact with the depositing agent under the influence of a turbulent shear force so as to divide the deposited polymer into fine particles. The method, however, has a disadvantage that specific equipment must be used and thus an excessive plant cost is required.

Further, Japanese Laid-Open Patent SHO 58-206637 and 61-042531 have described a process for heat-dissolving polyhydroxycarboxylic acid in a solvent such as xylene or diethyl phthalate and removing the solvent by cooling the solution. The process can certainly provide powder of the polymer with ease. However, in the case of a polymer solution obtained by the direct polymerization process such as disclosed, for example, in Japanese Laid-Open Patent HEI 04-337321, a new solvent which differs from the solvent of polymerization is used. Moreover, when polyhydroxycarboxylic acid is deposited from the solvent according to the description, a large amount of the oligomer of the polymer remains in the separated solvent. Consequently, the separation and recovery of the solvent and oligomer become complex and require an excessive plant cost. Besides, the process has a problem that a high molecular weight polyhydroxycarboxylic acid solution having a high concentration solidifies the whole solution on cooling and thus the separation procedure of the polymer from the solvent by filtration according to the description is impossible to carry out.

The present inventors have obtained high molecular weight polyhydroxycarboxylic acid by carrying out direct polymerization of hydroxycarboxylic acid in a specific solvent and further found that the solid polymer can be obtained by controlling the reaction mass at a specific concentration and carrying out cooling crystallization (Japanese Laid-Open Patent HEI 06-172502). However, the form of the solid product obtained in the process can vary, such as in the form of powder, granules, block or mass depending upon the molecular weight of the polymer and the temperature condition at the crystallization step. Consequently, the concentration must be extremely lowered in the crystallization step in order to obtain the polymer in the form of powder or granule which can be handled with ease. Further, the above mentioned separation and recovery of the solvent and oligomer must be installed in order to separate the polymer from the solvent by filtration. Therefore, development of a technique for isolating the solid polyhydroxycarboxylic acid has been strongly desired in industry.

SUMMARY OF THE INVENTION

An object of the invention is to provide a process which can be converted with ease into a continuous mode and is favorable in industry for preparing solid polyhydroxycarboxylic acid from an organic solvent solution of polyhydroxycarboxylic acid.

Another object of the invention is to provide a process for isolating solid polyhydroxycarboxylic acid with ease and cheaply even under the conditions of high molecular weight and high concentration of the polymer.

As a result of an intensive investigation in order to provide a process for preparing polyhydroxycarboxylic acid efficiently and cheaply in industry, the present inventors have found that a mixture of the solid polymer can be isolated with ease and cheaply even under the conditions of high molecular weight and high concentration of the polymer by application of a specific treatment to an organic solvent solution of the polymer. Thus, the present invention has been completed.

That is, one aspect of the invention is a preparation process of solid polyhydroxycarboxylic acid, comprising subjecting an organic solvent solution of the polyhydroxycarboxylic acid to a cooling·solidification treatment and a grinding treatment.

DETAILED DESCRIPTION OF THE PREFERRED EMBODIMENTS

The present invention will be illustrated in detail hereinafter. The polyhydroxycarboxylic acid used in the process of the invention is a polymer obtained by direct dehydration the polymerization of aliphatic hydroxycarboxylic acids or oligomers derived from the acids.

Exemplary aliphatic hydroxycarboxylic acids include, 2-hydroxyethanoic acid, 2-hydroxypropanoic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid,
2-hydroxy-2-methylbutanoic acid, 2-hydroxy-2-ethylbutanoic acid,
2-hydroxy-2-methylpentanoic acid, 2-hydroxy-2-ethylpentanoic acid,
2-hydroxy-2-propylpentanoic acid, 2-hydroxy-2-butylpentanoic acid,
2-hydroxy-2-methylhexanoic acid, 2-hydroxy-2-ethylhexanoic acid,
2-hydroxy-2-propylhexanoic acid, 2-hydroxy-2-butylhexanoic acid,
2-hydroxy-2-pentylhexanoic acid, 2-hydroxy-2-methylheptanoic acid,
2-hydroxy-2-ethylheptanoic acid, 2-hydroxy-2-propylheptanoic acid,
2-hydroxy-2-butylheptanoic acid, 2-hydroxy-2-pentylheptanoic acid,
2-hydroxy-2-hexylheptanoic acid, 2-hydroxy-2-methyloctanoic acid,
2-hydroxy-2-ethyloctanoic acid, 2-hydroxy-2-propyloctanoic acid,
2-hydroxy-2-butyloctanoic acid, 2-hydroxy-2-pentyloctanoic acid,
2-hydroxy-2-hexyloctanoic acid, 2-hydroxy-2-heptyloctanoic acid,
3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid,
3-hydroxy-3-methylbutanoic acid, 3-hydroxy-3-methylpentanoic acid,
3-hydroxy-3-ethylpentanoic acid, 3-hydroxy-3-methylhexanoic acid,
3-hydroxy-3-ethylhexanoic acid, 3-hydroxy-3-propylhexanoic acid,
3-hydroxy-3-methylheptanoic acid, 3-hydroxy-3-ethylheptanoic acid,
3-hydroxy-3-propylheptanoic acid, 3-hydroxy-3-butylheptanoic acid,
3-hydroxy-3-methyloctanoic acid, 3-hydroxy-3-ethyloctanoic acid,
3-hydroxy-3-propyloctanoic acid, 3-hydroxy-3-butyloctanoic acid,
3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid,
4-hydroxy-4-methylpentanoic acid, 4-hydroxy-4-methylhexanoic acid,
4-hydroxy-4-ethylhexanoic acid, 4-hydroxy-4-methylheptanoic acid,
4-hydroxy-4-ethylheptanoic acid, 4-hydroxy-4-propylheptanoic acid,
4-hydroxy-4-methyloctanoic acid, 4-hydroxy-4-ethyloctanoic acid,
4-hydroxy-4-propyloctanoic acid, 4-hydroxy-4-butyloctanoic acid,
5-hydroxypentanoic acid, 5-hydroxyhexanoic acid, 5-hydroxyheptanoic acid, 5-hydroxyoctanoic acid,
5-hydroxy-5-methylhexanoic acid, 5-hydroxy-5-methylheptanoic acid,
5-hydroxy-5-ethylheptanoic acid, 5-hydroxy-5-methyloctanoic acid,
5-hydroxy-5-ethyloctanoic acid, 5-hydroxy-5-propyloctanoic acid,
6-hydroxyhexanoic acid, 6-hydroxyheptanoic acid, 6-hydroxyoctanoic acid, 6-hydroxy-6-methylheptanoic acid,
6-hydroxy-6-methyloctanoic acid, 6-hydroxy-6-ethyloctanoic acid,
7-hydroxyheptanoic acid, 7-hydroxyoctanoic acid, 7-hydroxy-7-methyloctanoic acid, and 8-hydroxyoctanoic acid.

Alternatively, a polymer obtained by melt polymerization of cyclic dimers such as glycolide and lactide can also be used. A copolymer of these aliphatic hydroxycarboxylic acids and a mixture of these polymers and copolymers can also be used. No particular restriction is imposed upon the preparation process of polyhydroxycarboxylic acid. Some of these hydroxycarboxylic acids, oligomers and cyclic dimers have an optically active carbon, and include D-, L- and D/L isomers. No particular restriction is put upon the form of these isomers in the process of the invention. That is, no restriction is imposed upon the form of polyhydroxycarboxylic acid.

When the polymer is prepared by the direct dehydration polymerization, the presence or absence of the polymerization catalyst can be arbitrarily selected depending upon the polymerization degree (inherent viscosity) of the desired polymer. A low molecular weight polymer having an inherent viscosity of less than 0.3 dl/g can be obtained with ease both in the presence and absence of the catalyst. However, a high molecular weight polymer having an inherent viscosity of 0.3 dl/g or more can be favorably prepared in the presence of the catalyst in view of reaction time (reaction velocity).

The catalysts which can be used are metals of the group I, II, III, IV and V in the periodic table and salts of these metals. Exemplary catalysts include, for example, zinc, tin, aluminum, magnesium, and other metals; tin oxide, antimony oxide, zinc oxide, aluminum oxide, magnesium oxide, titanium oxide and other metal oxides; zinc chloride, stannous chloride, stannous bromide, antimony fluoride, magnesium chloride, aluminum chloride and other metal halogenides; tin sulfate, zinc sulfate, aluminum sulfate and other metal sulfates; tin hydroxide, zinc hydroxide and other metal hydroxydes; magnesium carbonate, zinc carbonate, calcium carbonate and other metal carbonates; tin acetate, tin octoate, tin lactate, zinc acetate, aluminum acetate and other metal organic carboxylates; and tin trifluoromethanesulfonate, tin p-toluenesulfonate and other metal organic sulfonates.

Other catalysts also include dibutyltin oxide and other organometal oxides of the above metals; titanium isopropoxide and other alkoxides of the above metals; diethyl zinc and other metal alkyls of the above metals; and Dow X, Amberlite and other ion exchange resins.

The amount of the catalyst is preferably 0.0001~10% by weight for the above hydroxycarboxylic acid or the oligomer of the acid.

The direct dehydration polymerization can also be carried out in the presence of a coloration inhibitor in order to protect from coloration due to heat deterioration in the course of polymerization. Coloration inhibitors which can be preferably used include phosphoric acid, triphenyl phosphate, pyrophosphoric acid, phosphorus acid, triphenyl phosphite and other phosphorus compounds.

The amount of these compounds is preferably 0.01~5% by weight, more preferably 0.5~2% by weight for the polymer. An amount less than 0.01% by weight decreases the effect on inhibition of coloration. On the other hand, when the amount exceeds 0.5% by weight, further a effect on coloration inhibition cannot be expected and additionally, increases in polymerization degree becomes difficult in some cases.

The direct dehydration polymerization can be carried out under both atmospheric and reduced pressure. The range of polymerization temperature can be up to the reflux temperature of the solvent used and is preferably 50°~220° C., more preferably 100°~170° C. When the temperature is lower than 50° C., the efficiency for removing generated water from the reaction system is reduced and thus reaction velocity decreases extremely. On the other hand, a temperature exceeding 220° C. leads to deterioration of the polymer and thus results in coloration of the reaction mixture and impairs quality of the product obtained.

The organic solvents which can be used in the direct dehydration polymerization are aliphatic hydrocarbons, aromatic hydrocarbons, halogenated hydrocarbons, ethers and ketones. Organic solvents providing a high polymerization speed in the dehydration polycondensation are preferably used. Exemplary solvents include tetradecane, dodecane, biphenyl, naphthalene, dichlorobenzene, chloronaphthalene, hexyl ether, anisole, ethoxybenzene, 2,4-dichloromethoxybenzene, diphenyl ether, cyclohexyl ketone and acetophenone. These solvents can be used singly or as a mixture and no restriction is imposed upon the composition of the solvent mixture.

The amount of the solvent is in the range which gives a polymer concentration of usually 3~90% by weight, preferably 15~80% by weight, more preferably 30~70% by weight. When the polymer concentration exceeds 90% by weight, the viscosity of the solution obtained by heat dissolving the polymer becomes extremely high, and handling such as liquid transfer or an operating procedure such as stirring becomes difficult. On the other hand, a polymer concentration of less than 3% by weight leads to a problem in view of the volume efficiency, although no problem is found on the reaction and post treatments.

In the direct dehydration polymerization process, the reaction is dehydration polycondensation and thus the equipment for use in the reaction must be capable of removing water generated with the progress of the reaction to the outside of the reaction system in order to obtain a high molecular weight polymer. Removal of the generated water can be conducted by using a method for removing a refluxing mixture of solvent and water as intact to the outside of the reaction system or a method for passing the mixture through a dehydrating device and returning again the dried solvent to the reaction system.

In the dehydration device, the distilled solvent can be dried by use of a column packed with a dehydrating agent. Exemplary dehydrating agents include molecular sieves (3A, 4A, 5A etc.), silica gel and other inorganic drying agents; diphosphorus hydroxide, phosphorus pentoxide and other phosphorus compounds; calcium hydride, sodium hydride, lithium hydride and other metal hydrides; and sodium, lithium, potassium, calcium and other alkali metals and alkali-earth metals. In other methods which can be used, water contained in the refluxing solvent is separated and removed by using a device having the ability of distillation and separation. Alternatively, refluxing distillate can once flow out of the reaction system and is successively distilled and separated, and dehydrated solvent can return to the reaction system. No restriction is imposed upon the method as long as the solvent returning to the reaction system is substantially free from water.

The present invention is a preparation process of solid polyhydroxycarboxylic acid, comprising subjecting an organic solvent solution of polyhydroxycarboxylic acid to a cooling-solidification treatment and a grinding treatment.

Consequently, in the case of the direct dehydration polymerization process, polyhydroxycarboxylic acid is obtained in the form of an organic solvent solution and thus a concentration of the solution is suitably adjusted as such and the process of the invention can be applied to obtain a solid mixture of the polymer and organic solvent. However, in the case of the indirect polymerization process, polyhydroxycarboxylic acid is obtained in the form of a pellet and thus must be dissolved again in the above organic solvent and the resultant organic solvent solution is subjected to the process of the invention.

The polymer solution has, in the steps of the cooling-solidification treatment and the grinding treatment, a concentration of usually 15~95% by weight, preferably 20~80% by weight, more preferably 30~70% by weight, although the range somewhat differs depending upon the kind and molecular weight of the polymer. A polymer concentration lower than 15% by weight leads to problems on volume efficiency and treatment capacity, although no problem is observed at all on polymer separation. On the other hand, when the polymer concentration is higher than 95% by weight, viscosity of the solution increases accompanied by increase in the molecular weight of the polymer, load on the equipment becomes high and renders operation impossible.

The solid mixture of polyhydroxycarboxylic acid and the organic solvent in the process of the invention can be prepared by carrying out cooling-solidification and grinding at the same time, or by carrying out cooling-solidification in the first step and then subjecting the resultant solid mixture of the polymer and organic solvent to the grinding treatment.

In the process for carrying out the cooling-solidification treatment and grinding treatment at the same time, the organic solvent solution of polyhydroxycarboxylic acid is charged to a kneader and kneaded with cooling. The resulting solid mixture of the polymer is discharged from the kneader. In the course of operation, the polymer solution charged to the kneader increases in viscosity with progress of cooling, and gradually deposits the solid mixture of the polymer and organic solvent while simultaneously grinding the deposited solid by kneading.

On the other hand, in the process composed of cooling-solidification in the first step and grinding in the second step, the organic solvent solution of polyhydroxycarboxylic acid is once subjected to cooling-solidification and thereafter subjecting the resultant solid mixture of the polymer and organic solvent to grinding. In this case, for example, it includes a process for using a flaker and grinder.

The polymer solution is subjected to cooling solidification in the flaker and the once formed solid mixture of the polymer solution is thereafter ground with the grinder.

Any process can provide the solid mixture of the polymer in the form of handling with ease from the polymer solution of a high molecular weight and high concentration. Continuous preparation can be carried out with ease by selection of the equipment for use.

Generally known kneaders can be used for the grinding process of the invention. Preferred kneaders have two or more stirring blades which can make a complement for uniform kneading with good clearance to each other.

However, no particular restriction is put upon the mechanism and shape of the kneaders as long as the equipment can cool and knead the organic solvent solution of polyhydroxycarboxylic acid until deposition of the solid mixture of the polymer and organic solvent.

Exemplary kneaders of batch type include a twin arm kneader (so-called warner type kneader or simply called kneader), double planetary mixer, internal kneader (so-called internal mixer), molar type kneader (so-called edge runner mill) and roll mill. Exemplary kneaders of continuous type include a roll mill, potator, K.R.C. kneader (self-cleaning type reactor), in addition, screw extruder, mixtruder, gear compounder, cokneader and plastomill are included as another type kneader.

Trade marks of these kneaders include, for example, Table-top Kneader PN-1, PN-5, PNV-1, PNV-5, PBV etc. (manufactured from Irie Shokai Co.), Self-cleaning Reactor SCR, N-SCR, HVR (manufactured from Mitsubishi Heavy Industry Co.), SC processer SCP-100, KRC Kneader, KEX Extruder (manufactured from Kurimoto Iron Works Co,) and Eyeglass Blade Reactor (manufactured from Hitachi Co.), as a kneader having function for both cooling•solidification and grinding.

In the case of conducting cooling•solidification on the organic solvent solution of polyhydroxycarboxylic acid and thereafter grinding the solid mixture of the polymer and organic solvent, any type of cooling equipment and grinding equipment can be used as long as the organic solvent solution of the polymer can be cooled, solidified and thereafter ground. No restriction is imposed upon the shape, type, cooling method and grinding method of the equipment.

The equipment for use in the cooling·solidification preferably has a thin-film forming function, and more preferably the equipment has at the same time a function for grinding the resulting solid mixture of the polymer and organic solvent. Generally known cooling·solidification equipment having the thin-film forming function includes, for example, single belt flakers, double belt flakers and drum flakers such as a flaker manufactured from Tamagawa Kikai Co., rotary cooler manufactured from Nippon Shinku Co. and drum cooler manufactured from Mitsubishi Kasei Techno-engineers Co.

When the organic solvent solution of polyhydroxycarboxylic acid is treated with the above equipment, the temperature in the equipment or at the charging portion of the polymer solution is in the range of usually 150°~−10° C., preferably 100°~0° C., more preferably 80°~10° C.

A temperature exceeding 150° C. leads to problems such as quality deficiency due to deterioration of the polymer and poor deposition of the solid mixture due to dissolution of the polymer into the organic solvent. On the other hand, when the temperature is lower than −10° C., excessive labor is required for cooling.

The organic solvent solution of the polymer is subjected to cooling·solidification treatment at a cooling rate of usually 0.01°~200° C./min, preferably 0.01°~100° C./min, more preferably 0.01°~20° C./min. A cooling rate exceeding 200° C./min requires excessive labor for cooling.

The shape of the solid mixture of polyhydroxycarboxylic acid and the organic solvent differs depending upon the shape of the kneader (amount of clearance between the stirring blade and inner wall), shape of the grinder for use in the process, molecular weight and concentration of the polymer, and cooling rate, The solid mixture has a shape of powder granule, pellet, flake. The bulk density is in the range of 0.05~0.6 g/ml. Consequently, when the solid mixture which can be handled with ease is desired, a suitable shape of the blade is selected for the kneader and grinder. Alternatively, the solid mixture of the polymer obtained by treating with the kneader and grinder can be further treated with a grinder to obtain the desired particle size.

In the grinding step, a dry grinding process which grinds the solid mixture as intact and an wet grinding process which grinds the solid mixture in a liquid medium such as an organic solvent and water can also be carried out.

Dry grinders include, for example, Rotoplex, Hammer Mill, and Bantam Mill (which are manufactured from Hosokawa Micron Corp.). Wet grinders include Disintegrotor (manufactured from Komatsu Zenoah Co.) and Goratol Pump (manufactured from Tosho Co.).

No restriction is imposed upon the shape and type of the grinder as long as the solid mixture can be ground.

The desired solid polymer can be prepared with ease by separating the solvent with a known process from the solid mixture of the polymer and solvent.

The process of the invention will hereinafter be illustrated by way of examples. However, the process and equipment in these examples are not to be construed to limit the scope of invention.

Inherent Viscosity ($\eta$ inh)
Shown by the following formula: $\eta$ inh=l n $(t/t_o)/C$ wherein
   $t_o$=flow down time of the solvent in the viscosimeter.
   t=flow down time of a dilute polymer solution by using the same viscosimeter and solvent
   c=concentration of solid polymer shown by grams in 100 ml solution.
Measured in concentration of 0.1 g solid polymer/20 ml dichloromethane at temperature 20° C.
Weight Average Molecular Weight (Mw)
Measured with Shodex GPC system-11 (manufactured from Showa Denko Co. Mw was converted to polystyrene.)

EXAMPLE 1

After heating 104.2 g of 90% L-lactic acid at 130° C./50 mmHg with stirring for 3 hours while removing water out of the system, 75 g of diphenyl ether and 0.4 g of tin powder was added. A Dean Stark trap having a tube packed with 30 g of molecular sieve 3A was mounted on the reaction vessel so as to return distilled solvent to the reaction system after passing through the molecular sieve layer. Reaction was carried out at 130° C./15 mmHg for 30 hours. After finishing the reaction, the reaction mixture was charged to a Σ-type kneader PNV-1H (manufactured from Irie Shokai Co.) and cooled to 20° C. over an hour with kneading. In the course of kneading, the polymer solution was ground while solidifying gradually and provided a white powder. The powder of the polymer/diphenyl ether mixture having a polymer concentration of 50% by weight was washed and filtered three times with each 300 g of methanol and dried at 60° C. under reduced pressure(100 mmHg) to obtain L-polylactic acid in the form of white powder.

Yield was 93.1%. Weight average molecular weight was 212,000. Inherent viscosity was 1.51 dl/g. Bulk density was 0.25 g/ml.

EXAMPLE 2

The same procedures as described in Example 1 were carried out except that 90% L-lactic acid was replaced by 75 g of 90% L-lactic acid and 15 g of 90% D/L-lactic acid. As a result, a copolymer of L-lactic acid and D/L lactic acid was obtained in the form of white powder.

Yield was 94.2%. Weight average molecular weight was 231,000. Inherent viscosity was 1.60 dl/g. Bulk density was 0.21 g/ml.

EXAMPLE 3

The same procedures as described in Example 1 were carried out except that 90% L-lactic acid was replaced by 75 g of 90% L-lactic acid and 9.6 g of 70% glycolic acid. As a result, a copolymer of L-lactic acid and glycolic acid was obtained in the form of white powder.

Yield was 87.2%. Weight average molecular weight was 182,000. Inherent viscosity was 1.30 dl/g. Bulk density was 0.22 g/ml.

EXAMPLE 4

The same procedures as described in Example 1 were carried out except that 90% L-lactic acid was replaced by 75 g of 90% L-lactic acid and 6.8 g of DL-4-hydroxybutanoic acid. As a result, a copolymer of L-lactic acid and DL-4-hydroxybutanoic acid was prepared in the form of white powder.

Yield was 89.6%. Weight average molecular weight was 165,000. Inherent viscosity was 1.22 dl/g. Bulk density was 0.19 g/ml.

EXAMPLE 5

The same procedures as described in Example 1 were carried out except that 90% L-lactic acid was replaced by 75 g of 90% L-lactic acid and 6.8 g of DL-3-hydroxybutanoic acid. As a result, a copolymer of L-lactic acid and DL-3-hydroxybutanoic acid was obtained in the form of white powder.

Yield was 88.3%. Weight average molecular weight was 152,000. Inherent viscosity was 1.12 dl/g. Bulk density was 0.19 g/ml.

EXAMPLE 6

The same procedures as described in Example 1 were carried out except that diphenyl ether was replaced by anisole and polymerization conditions were varied to 130° C./350 mmHg. As a result, Poly-L-lactic acid was obtained in the form of white powder.

Yield was 88.6%. Weight average molecular weight was 152,000. Inherent viscosity was 1.12 dl/g. Bulk density was 0.25 g/ml.

EXAMPLE 7

The anisole solution of poly-L-lactic acid which was obtained by carrying out the same procedures as described in Example 6 was charged to a kneader equipped with a Dean Stark trap and reflux condenser and concentrated to 75% by weight by distilling out the solvent at 130° C./350 mmHg. Thereafter the same procedures as described in Example 1 were carried out. Poly-L-Lactic acid thus obtained was white powder.

Yield was 88.5%. Weight average molecular weight was 155,000. Inherent viscosity was 1.14 dl/g. Bulk density was 0.23 g/ml.

EXAMPLE 8

The same procedures as described in Example 6 were carried out except that 225 g of anisole was used. As a result, poly-L-lactic acid was obtained in the form of white powder.

Yield was 88.5%. Weight average molecular weight was 155,000. Inherent viscosity was 1.14 dl/g. Bulk density was 0.24 g/ml.

EXAMPLE 9

The same procedures as described in Example 1 were carried out except that diphenyl ether was replaced by o-dichlorobenzene and polymerization condition were varied to 140° C./250 mmHg. Poly-L-lactic acid was obtained in the form of white powder.

Yield was 91.1%. Weight average molecular weight was 172,000. Inherent viscosity was 1.25 dl/g. Bulk density was 0.26 g/ml.

EXAMPLE 10

The same procedures is described in Example 7 were carried out except that anisole was replaced by o-dichlorobenzene and polymerization conditions were varied to 140° C./250 mmHg. Poly-L-lactic acid was obtained in the form of white powder.

Yield was 90.8%. Weight average molecular weight was 174,000. Inherent viscosity was 1.26 dl/g. Bulk density was 0.25 g/ml.

EXAMPLE 11

To a 2000 ml three necked flask equipped with a Dean Stark trap, reflux condenser, thermometer and stirrer, 1500 g of 90% L-lactic acid was charged and heated to 150° C. The pressure in the flask was gradually reduced to 30 mmHg and a dehydration reaction was carried out for 8 hours. Zinc powder was added to the reaction mixture and further reacted at 200° C./5 mmHg for 4 hours while distilling out cyclic dimer of lactic acid (lactide). The yield of lactide was 85% by mole for lactic acid. Lactide was recrystallized from ethyl acetate and dried. Thereafter, purified lactide was mixed with 0.1% by weight of a stannous octoate catalyst and 2% by weight of a lauryl alcohol molecular weight controller for the weight of lactide. The mixture was reacted in a nitrogen atmosphere at 180° C. for 4 hours with stirring.

After finishing the reaction, the reaction mixture was discharged from the bottom of the reactor in the form of a strand. The strand was cooled to room temperature and cut with a pelletizer. The L-polylactic acid pellets thus obtained had an weight average molecular weight of 165,000 and inherent viscosity of 1.21 dl/g.

A kneader was charged with 200 g of the poly-L-lactic acid pellets and 100 g of diphenyl ether. The mixture was heated at 130° C. for an hour with stirring to dissolve the pellets into diphenyl ether, and thereafter cooled gradually to 20° C. over an hour with kneading.

The resultant solid mixture of polylactic acid and diphenyl ether was washed three times with each 800 g of methanol and dried at 60° C. under reduced pressure.

Poly-L-lactic acid thus obtained was white powder and had the yield of 98.7%, weight average molecular weight of 165,000, inherent viscosity of 1.23 dl/g and bulk density of 0.20 g/ml.

EXAMPLE 12

The same procedures as described in Example 11 were carried out except that the amount of the pellets charged to the kneader was varied to 100 g and diphenyl ether was replaced by 150 g of xylene. Polylactic acid was obtained in the form of white powder and had the yield of 98.5%, weight average molecular weight of 165,000, inherent viscosity of 1.21 dl/g and bulk density of 0.22 g/ml.

EXAMPLE 13

After heating 104.2 g of 90% L-lactic acid at 130° C./50 mmHg for 3 hours with stirring while removing water out of the reaction system, 75 g of diphenyl ether and 0.4 g of tin powder were added. A Dean Stark trap having a tube packed with 30 g of molecular sieve 3A was mounted on the reaction vessel so as to return distilled solvent to the reaction system after passing through the molecular sieve layer. The mixture was reacted at 130° C./15 mmHg for 30 hours.

Into a flat bottom flask having an internal diameter of 12 cm, 70 g of thus obtained diphenyl ether solution of poly-L-lactic acid was poured and gradually cooled to room temperature. In the course of cooling, poly-L-lactic acid was deposited from the solution with temperature decrease and finally solidified to form a uniform thin-film. The thin-film of the solid mixture of poly-L-lactic acid and diphenyl ether having a polymer concentration of 50% by weight was scraped, and ground with a homogenizer in 300 ml of methanol. The solid was successively sludged and filtered three times, and dried at 60° C. under reduced pressure.

Poly-L-lactic acid was obtained in the form of white powder and had the yield of 92.1%, weight average molecular weight of 214,000, inherent viscosity of 1.54 dl/g, and bulk density of 0.24 g/ml.

EXAMPLE 14

The same procedures as described in Example 13 were carried out except that 90% L-lactic acid was replaced by 75 g of 90% L-lactic acid and 15 g of 90% D/L-lactic acid. As a result, a copolymer of L-lactic acid and D/L-lactic acid was obtained in the form of white powder.

Yield was 92.8%. Weight average molecular weight was 229,000. Inherent viscosity was 1.59 dl/g. Bulk density was 0.23 g/ml.

EXAMPLE 15

The same procedures as described in Example 13 were carried out except that 90% L-lactic acid was replaced by 75 g of 90% L-lactic acid and 9.6 g of 70% glycolic acid. As a result, a copolymer of L-lactic acid and glycolic acid was obtained in the form of white powder.

Yield was 86.3%. Weight average molecular weight was 186,000. Inherent viscosity was 1.30 dl/g. bulk density was 0.26 g/ml.

EXAMPLE 16

The same procedures as described in Example 13 were carried out except that 90% L-lactic acid was replaced by 75 g of 90% L-lactic acid and 6.8 g of DL-4-hydroxybutanoic acid. As a result, a copolymer of L-lactic acid and DL-4-hydroxybutanoic acid was obtained in the form of white powder.

Yield was 88.7%. Weight average molecular weight was 165,000. Inherent viscosity was 1.22 dl/g. Bulk density was 0.21 g/ml.

EXAMPLE 17

The same procedures as described in Example 13 were carried out except that 90% L-lactic acid was replaced by 75 g of 90% L-lactic acid and 6.8 g of DL-3-hydroxybutanoic acid. As a result, a copolymer of L-lactic acid and DL-3-hydroxybutanoic acid was obtained in the form of white powder.

Yield was 90.1%. Weight average molecular weight was 151,000. Inherent viscosity was 1.13 dl/g. Bulk density was 0.23 g/ml.

EXAMPLE 18

To a 200 liter reactor, 69.5 kg of 90% L-lactic acid was charged and heated with stirring at 130° C./50 mmHg for 3 hours while removing water the system. Thereafter 50 kg of anisole and 133 g of tin powder were added and reacted at 130° C./350 mmHg for 30 hours while returning distilled anisole to the reaction system after passing through a dehydration device packed with molecular sieve 3A.

The anisole solution of polylactic acid thus obtained was solidified by cooling in a drum flaker at drum temperature of 0°~10° C., revolution number of 1 rpm and throughput of 2.2 kg/hr. The resulting coarse grains of the solid mixture of the polymer solution was dry ground at a screen size of 1 mm with a Rotoplex R-20/10 (manufactured from Hosokawa Micron co.). The ground product was sludged and filtered three times with each 200 kg of methanol and dried at 60° C. under reduced pressure. The polylactic acid was obtained in the form of white flake.

Yield was 89.2%. Weight average molecular weight was 155,000. Inherent viscosity was 1.12 dl/g. Bulk density was 0.16 g/ml.

EXAMPLE 19

The synthesis and cooling-solidification were carried out by the same procedures as described in Example 18 except that anisole was replaced by diphenyl ether and polymerization conditions were varied to 130° C.5 mmHg. Coarse grains of the solid mixture of polylactic acid and diphenyl ether were thus obtained.

To a 200 liter reaction vessel, 25 kg of the coarse grains and 100 kg of isopropyl alcohol were charged and wet grinding was carried out with stirring at 200 rpm while circulating the slurry from the bottom of the reaction vessel with a Goratol pump (manufactured by Tosho Co.).

After grinding, sludging and filtration were repeated twice and drying was carried out at 60° C. under reduced pressure. Polylactic acid was obtained in the form of white powder.

Yield was 86.7%. Weight average molecular weight of 198,000. Inherent viscosity was 1.52 dl/g. Bulk density was 0.14 g/ml.

EXAMPLE 20

The same procedures as described in Example 18 were carried out except that anisole was replaced by o-dichlorobenzene and polymerization conditions were varied to 140° C./250 mmHg. As a result, polylactic acid was obtained in the form of white flake.

Yield was 87.0%. Weight average molecular weight was 182,000. Inherent viscosity was 1.39 dl/g. Bulk density was 0.16 g/ml.

EXAMPLE 21

Into a flat bottom flask having an internal diameter of 12 cm, 37 g of the poly-L-lactic acid pellet obtained by the same procedures as described in Example 11 and 37 g of o-dichlorobenzene were charged. After dissolving the pellet at 130° C., the solution was gradually cooled to obtain a solid mixture of polylactic acid and o-dichlorobenzene. The solid mixture was scraped out and ground with a homogenizer in 300 g of methanol. The ground product was sludged and filtered three times, and dried under reduced pressure. Polylactic acid was obtained in the form of white powder.

Yield was 92.1%. Weight average molecular weight was 164,000. Inherent viscosity was 1.19 dl/g. Bulk density was 0.24 g/ml.

What is claimed is:

1. A process for preparing solid polyhydroxycarboxylic acid consisting essentially of charging an organic solvent solution of polyhydroxycarboxylic acid into a kneader and discharging a solid mixture of the polymer and the organic solvent while carrying out cooling and kneading or consisting essentially of cooling and solidifying an organic solvent solution of polyhydroxycarboxylic acid to obtain a solid mixture of the polymer and the organic solvent and thereafter grinding the solid mixture of the polymer and the organic solvent.

2. The process according to claim 1 wherein the solid mixture of the polymer and the organic solvent is treated to remove the solid organic solvent.

3. The process according to claim 1 wherein the organic solvent solution of polyhydroxycarboxylic acid is obtained by dehydration condensation of a hydroxycarboxylic acid or an oligomer thereof with or without a catalyst in the organic solvent solution.

4. The process according to claim 1 wherein the polyhydroxycarboxylic acid has an inherent viscosity of 0.3~5.0 dl/g.

5. The process according to claim 1 wherein the organic solvent solution of polyhydroxycarboxylic acid has a concentration of 15~95% by weight.

6. The process according to claim 3 wherein a catalyst is present in the organic solvent solution and the catalyst is a divalent tin compound or tin powder.

7. The process according to claim 6 wherein the divalent tin compound is selected from stannous chloride, stannous hydroxide, tin sulfate and stannous oxide.

* * * * *